United States Patent
Meng et al.

(10) Patent No.: US 12,389,059 B2
(45) Date of Patent: Aug. 12, 2025

(54) APPARATUS, SYSTEM, AND METHOD FOR AUTOMATICALLY SWITCHING TO A DIGITAL MULTIMEDIA CONTENT PROVIDER

(71) Applicant: Toyota Motor Engineering & Manufacturing North America, Inc., Plano, TX (US)

(72) Inventors: Ming Michael Meng, Novi, MI (US); Wilson-Boon Siang Khoo, Allen, TX (US)

(73) Assignees: Toyota Motor Engineering & Manufacturing North America, Inc., Plano, TX (US); Toyota Jidosha Kabushiki Kaisha (JP)

( * ) Notice: Subject to any disclaimer, the term of this patent is extended or adjusted under 35 U.S.C. 154(b) by 62 days.

(21) Appl. No.: 18/374,659

(22) Filed: Sep. 28, 2023

(65) Prior Publication Data
US 2025/0113076 A1 Apr. 3, 2025

(51) Int. Cl.
*H04N 21/414* (2011.01)
*H04N 21/238* (2011.01)
*H04N 21/258* (2011.01)

(52) U.S. Cl.
CPC ..... *H04N 21/41422* (2013.01); *H04N 21/238* (2013.01); *H04N 21/25891* (2013.01)

(58) Field of Classification Search
CPC ........... H04N 21/41422; H04N 21/238; H04N 21/25891
See application file for complete search history.

(56) References Cited

U.S. PATENT DOCUMENTS

| | | | |
|---|---|---|---|
| 9,098,367 B2 | 8/2015 | Ricci | |
| 9,361,373 B1 * | 6/2016 | Price | H04N 21/2668 |
| 2004/0092253 A1 | 5/2004 | Simonds et al. | |
| 2013/0081085 A1 * | 3/2013 | Skelton | H04N 21/4826 |
| | | | 725/46 |

(Continued)

FOREIGN PATENT DOCUMENTS

| | | |
|---|---|---|
| EP | 2891341 A1 | 7/2015 |
| KR | 101673305 B1 | 11/2016 |
| KR | 101958885 B1 | 7/2019 |

*Primary Examiner* — Nnenna N Ekpo
(74) *Attorney, Agent, or Firm* — Snell & Wilmer LLP

(57) ABSTRACT

Apparatuses, systems, and methods for automatically switching to a digital multimedia content provider. The system includes a server in data communication with one or more vehicles and one or more digital multimedia content provider servers. The server may include a memory storing keyword data and a processor connected to the memory. The processor may receive identifying information corresponding to a vehicle occupant or interest information associated with the vehicle occupant from a vehicle. The processor may receive streaming data from the digital multimedia content provider servers. The processor may compare the received streaming data against the keyword data. The processor may detect a match between the streaming data and the keyword data based on the comparison. The processor may identify at least one digital multimedia content provider server based on the detected match. The processor may transmit data related to the identified digital multimedia content provider server to the vehicle.

18 Claims, 5 Drawing Sheets

(56) References Cited

U.S. PATENT DOCUMENTS

| | | | |
|---|---|---|---|
| 2014/0123006 A1* | 5/2014 | Chen | H04N 21/26258 |
| | | | 715/716 |
| 2015/0229420 A1 | 8/2015 | Williams et al. | |
| 2017/0150221 A1* | 5/2017 | Jamil | H04N 21/4383 |
| 2023/0106867 A1 | 4/2023 | Chan et al. | |
| 2023/0141088 A1 | 5/2023 | Giovagnoni | |
| 2023/0308708 A1* | 9/2023 | Raghavan | G06Q 30/0276 |
| 2024/0292047 A1* | 8/2024 | Panchaksharaiah | |
| | | | H04N 21/41422 |

\* cited by examiner

APPARATUS, SYSTEM, AND METHOD FOR AUTOMATICALLY SWITCHING TO A DIGITAL MULTIMEDIA CONTENT PROVIDER

BACKGROUND

Field

The present disclosure relates to apparatuses, systems, and methods for automatically switching to a digital multimedia content provider, e.g., on an in-vehicle infotainment (IVI) system.

Description of the Related Art

A conventional IVI system on a vehicle may provide a means for a vehicle occupant to access digital multimedia content from a plurality of content sources. For example, the conventional IVI system provides a platform for connecting to various digital multimedia content sources such as a satellite radio service, an online radio service, a multimedia streaming service, a podcast service, or the like. While the conventional IVI system may provide some information to the vehicle occupant, such as a list of content sources based on, e.g., genre, it does not provide an efficient way for the vehicle occupant to find the content they want at a specific desired time. That is, the conventional IVI system does not provide an efficient way to keep track of the plurality of content sources to allow the vehicle occupant to tune into particular content sources when the particular content sources are providing the content that the vehicle occupant may be interested in consuming.

Accordingly, there is a need for apparatuses, systems, and methods to efficiently (e.g., automatically) switch to a digital multimedia content provider on an IVI system.

SUMMARY

Described herein is a system for automatically switching to a digital multimedia content provider. The system may include a server. The server may be in data communication with one or more vehicles. The server may be in data communication with one or more digital multimedia content provider servers. The server may include a memory. The memory may be configured to store keyword data. The server may include a processor. The processor may be connected to the memory. The processor may be configured to receive at least one of identifying information corresponding to a vehicle occupant or interest information associated with the vehicle occupant from a vehicle of the one or more vehicles. The processor may be configured to identify one or more keywords from the keyword data based on the received at least one of the identifying information or the interest information. The processor may be configured to receive streaming data from the one or more digital multimedia content provider servers. The processor may be configured to compare a predetermined amount of the received streaming data against the identified one or more keywords. The processor may be configured to detect a match between at least a portion of the predetermined amount of the received streaming data and at least a portion of the one or more keywords based on the comparison. The processor may be configured to identify at least one digital multimedia content provider server of the one or more digital multimedia content provider servers based on the detected match. The processor may be configured to transmit data related to the identified at least one digital multimedia content provider server to the vehicle.

Also described is a method for automatically switching to a digital multimedia content provider. The method may include receiving, via a transceiver, interest information associated with a vehicle occupant from a vehicle. The interest information may include one or more listening preferences of the vehicle occupant. The method may include generating, via a processor, data corresponding to a user profile. The user profile may be associated with the vehicle occupant. The user profile may include at least a portion of the interest information. The method may include receiving, via the transceiver, streaming data from at least one digital multimedia content provider server. The streaming data may include at least audio data. The method may include converting, via the processor, the audio data into text data corresponding to the audio data. The method may include comparing, via the processor, a predetermined amount of the text data against the one or more listening preferences of the vehicle occupant. The method may include detecting, via the processor, a match between a portion of the predetermined amount of the text data and a portion of the one or more listening preferences of the vehicle occupant in response to the comparing. The method may include identifying, via the processor, the at least one digital multimedia content provider server in response to detecting the match between the portion of the predetermined amount of the text data and the portion of the one or more listening preferences of the vehicle occupant. The method may include transmitting, via the transceiver, data related to the identified at least one digital multimedia content provider server to the vehicle.

Moreover, also described is an in-vehicle infotainment (IVI) system for automatically switching to a digital multimedia content provider. The IVI system may include a user interface. The user interface may include an input module. The user interface may include an output module. The IVI system may include a processor. The processor may be coupled to the user interface. The processor may be configured to receive first user input via the input module. The first user input may include one or more listening preferences of a vehicle occupant. The processor may be configured to transmit data including at least a portion of the received user input to a remote server via a transceiver connected to the processor. The processor may be configured to receive data including information related to a digital multimedia content provider associated with the one or more listening preferences of the vehicle occupant from the remote server via the transceiver. The processor may be configured to display a notification via the output module. The notification may include the information related to the digital multimedia content provider associated with the one or more listening preferences of the vehicle occupant. The processor may be configured to receive second user input. The second user input may be indicative of a confirmation of switching to the digital multimedia content provider on the IVI system. The processor may be configured to start receiving streaming data from the digital multimedia content provider via the transceiver and outputting the received streaming data via the output module.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes apparatuses, systems, and methods for automatically switching to (i.e., tuning into) a digital multimedia content provider, e.g., on an in-vehicle infotainment (IVI) system. The apparatuses, systems, and methods described herein provide many benefits and advantages including enabling the IVI system to automatically switch to various digital multimedia content providers (e.g., for satellite radio, online radio, multimedia streaming, and podcast programs) in accordance with a vehicle occupant (e.g., a driver or a passenger)'s interest.

The apparatuses, systems, and methods described herein may utilize a remote server (e.g., a cloud server) to monitor digital multimedia content (e.g., digital audio content) from a plurality of content sources and one or more interests of the vehicle occupant, e.g., when a vehicle having the IVI system described herein is in use (e.g., when being driven). When the IVI system described herein detects the content of the vehicle occupant's interest being provided (i.e., based on the monitoring of the digital multimedia content being provided by the plurality of content sources), the IVI system can provide a notification to the vehicle occupant via an output device such as, e.g., a display or a speaker. The vehicle occupant can then choose to switch to the content source providing the digital multimedia content of the vehicle occupant's interest or, e.g., stay on a current content source. Additional benefits and advantages of the apparatuses, systems, and methods described herein include, e.g., providing the vehicle occupant with timely and relevant information while minimizing distraction(s). By leveraging a remote server utilizing, e.g., the cloud technology, the apparatuses, systems, and methods described herein can automatically and continuously update the knowledge base on the remote server and offer one or more personalized recommendations regarding the digital multimedia content provider to tune into based on the vehicle occupant's preferences as well as other considerations such as, e.g., driving conditions.

In various embodiments, the apparatuses, systems, and methods described herein may interface with the vehicle occupant using various types of interfaces including, e.g., an augmented reality (AR) platform to interact with a head unit (HU) to switch to one or more digital multimedia content providers in accordance with a preset schedule and/or preference of the vehicle occupant. The apparatuses, systems, and methods described herein can also record the digital multimedia content (e.g., in whole or in part) for replay.

Figure 1:
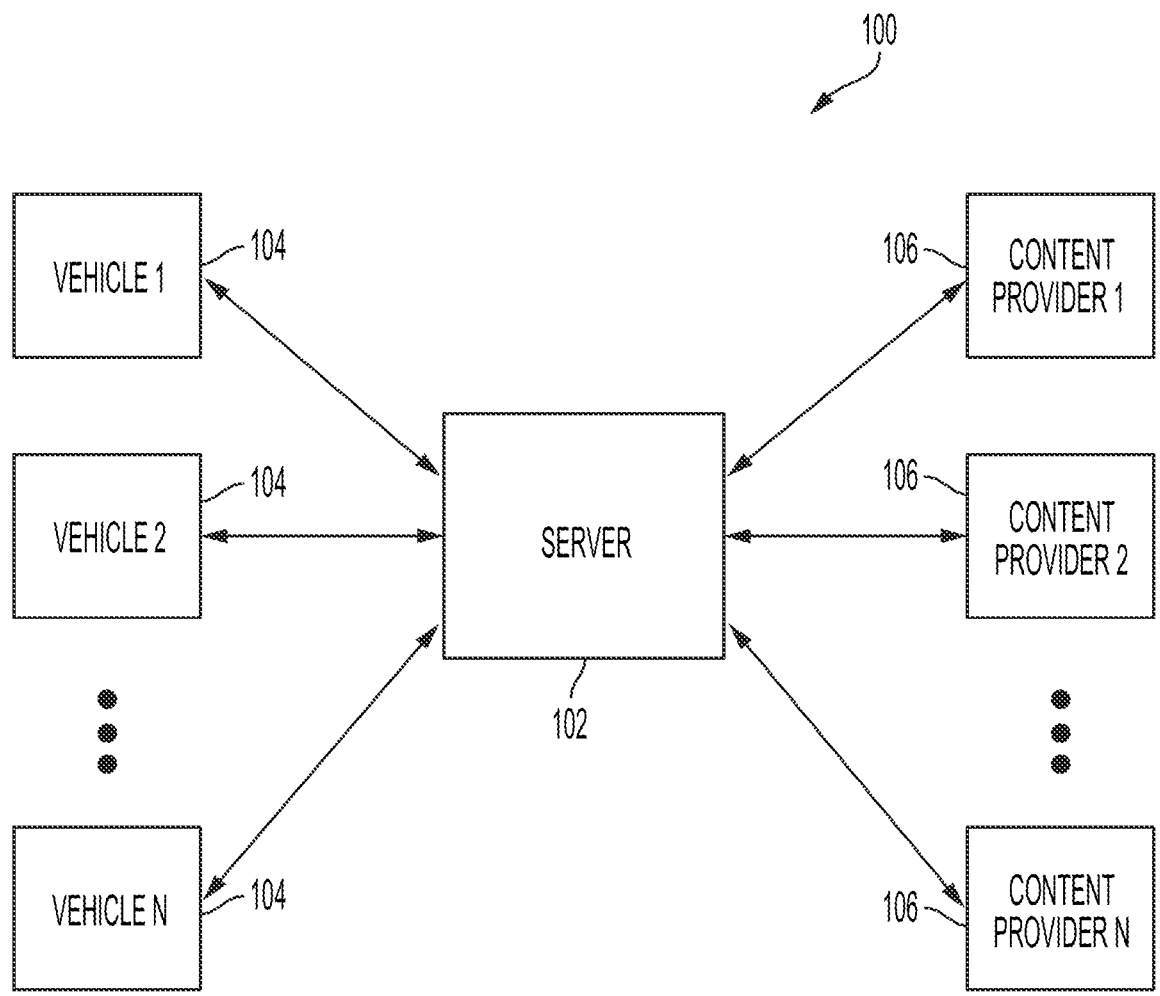
FIG. 1 is a block diagram illustrating a system for automatically switching to a digital multimedia content provider on an in-vehicle infotainment (IVI) system according to an embodiment of the present invention.

FIG. 1 is a block diagram illustrating a system 100 for automatically switching to a digital multimedia content provider, e.g., on an IVI system. The system 100 may include a server 102, a plurality of vehicles 104, and a plurality of digital multimedia content provider servers (also referred to herein as digital multimedia content providers and content sources) 106. The server 102 may be in data communication with the plurality of vehicles 104 and the plurality of digital multimedia content provider servers 106. The data communication may be, e.g., wireless (i.e., provided by any type of wireless connection known in the art such as, for example, Bluetooth, Wi-Fi, a cellular network, etc.). In some embodiments, the data communication may be, in part, wired.

The server 102 may be a remote server located remotely from the plurality of vehicles 104 and/or the plurality of digital multimedia content provider servers 106. For example, the server 102 may be a cloud server configured to perform one or more operations described herein (e.g., as shown in and described herein with respect to FIG. 2).

The plurality of vehicles 104 may each be any type of vehicle known in the art configured to transport, e.g., a vehicle occupant (e.g., a driver or a passenger) and propelled by an engine, a motor, or the like, while being at least partially (or fully) powered by fuel or electricity and, in some embodiments, including at least one energy storage device such as a battery. The plurality of vehicles 104 may each be non-autonomous, fully autonomous, or semi-autonomous. In that regard, the plurality of vehicles 104 may each be operated in an autonomous, semi-autonomous, or fully driver-operated state.

The plurality of digital multimedia content provider servers 106 may each be a computerized apparatus configured to provide various types of multimedia content (e.g., audio data, video data, audiovisual data, or the like).

In various embodiments, the server 102, the plurality of vehicles 104, and the plurality of digital multimedia content provider servers 106 may cooperatively operate to provide an improved technical solution for automatically identifying the particular digital multimedia content of specific interest for a user to tune into as described herein—e.g., beyond relying on general genre information associated with a given digital multimedia content provider.

As an aside, each of the components described herein may be or include an apparatus, a device, a system, a module (e.g., hardware or software), a circuitry, or the like configured to perform the disclosed operation(s).

Figure 2:
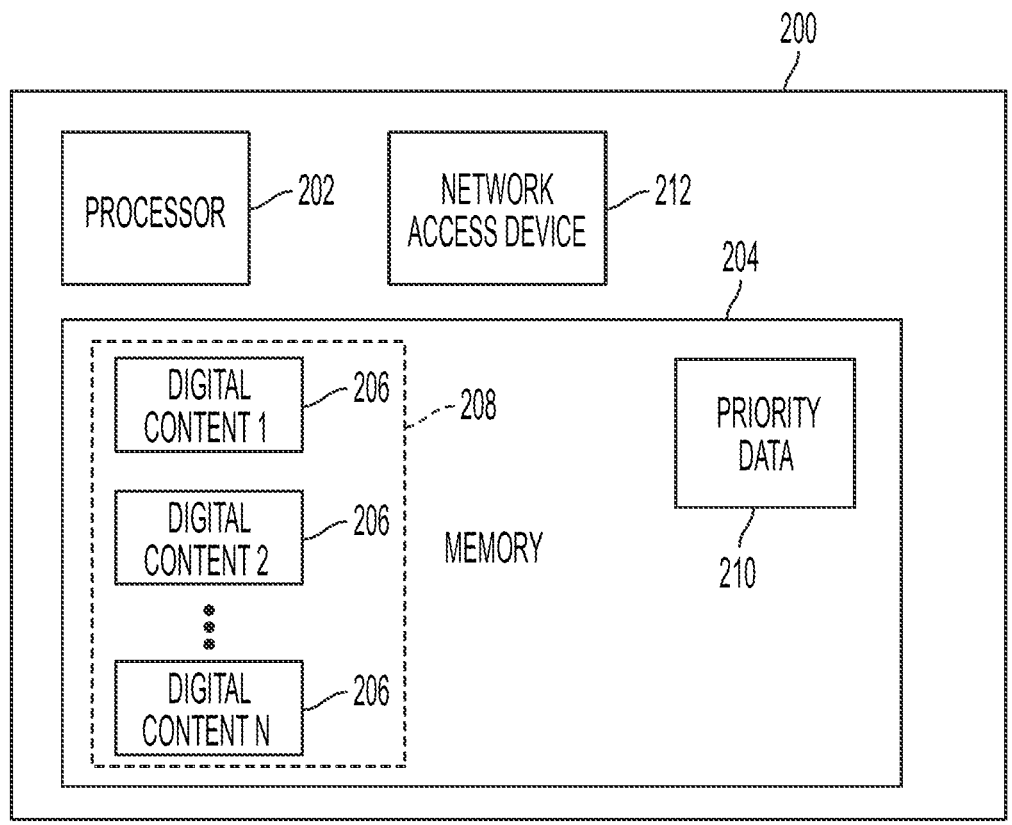
FIG. 2 is a block diagram illustrating an apparatus for automatically switching to a digital multimedia content provider on an IVI system according to an embodiment of the present invention.

Turning now to FIG. 2, an apparatus 200 for automatically switching to a digital multimedia content provider, e.g., on an IVI system is shown. The apparatus 200 may be an example of the server 102 shown in and described herein with respect to FIG. 1. The apparatus 200 may include a processor 202, a memory 204, and a network access device 212.

The processor 202 may include or couple to one or more processors. These one or more processors may be implemented as a single processor or as multiple processors. For example, the processor 202 may be or include a microprocessor, a data processor, a microcontroller, or other controller, and may be coupled (e.g., electrically) to at least the memory 204 and the network access device 212. The processor 202 may be a dedicated processor or controller for the apparatus 200 or may be coupled to or be a part of another apparatus or system which controls other devices or perform different or additional operations, too.

The memory 204 may store a plurality of instructions to be executed by the processor 202 and may include one or more of a RAM (Random Access Memory) or other volatile or non-volatile memory. The memory 204 may be a non-transitory memory or a data storage device, such as a hard disk drive, a solid-state disk drive, a hybrid disk drive, or other appropriate data storage, and may further store machine-readable instructions, which may be loaded and executed by the processor 202.

The network access device 212 may include any network access device capable of communicating via a communications protocol (e.g., a wireless protocol). For example, the network access device 212 may include a transceiver and communicate via Bluetooth, Wi-Fi, a cellular protocol, Zigbee, or any other communications (e.g., wireless) protocol.

In various embodiments, the memory 204 may be configured to store keyword data (e.g., text data corresponding to or related to one or more subject matters of interest of a vehicle occupant). In some embodiments, the memory 204 may also store data corresponding to or related to one or more listening/watching preferences (e.g., relating to types of audio or image/video data) of the vehicle occupant.

In various embodiments, the processor 202 may receive interest information (e.g., relating to subject matters of interest) from a vehicle occupant. The interest information may be received from the vehicle occupant by a user interface such as any type of input device or module available on an IVI system on or within a vehicle connected to the apparatus 200. The interest information may be received by the vehicle (e.g., the IVI system) as any type of input data including, e.g., text data or audio data (speech data). In some embodiments, the input data may include a selection of a plurality of interest-related menu options. The interest information may also be received via a user device (e.g., a mobile device) connected to the user interface on or within the vehicle. In some embodiments, the user device may connect directly to the apparatus 200 (e.g., via a software application program configured to run on the user device and communicate with the apparatus 200), and the interest information may be received at the apparatus 200 from the user device directly (i.e., without going through the user interface on or within the vehicle).

The processor 202 may also receive identifying information (e.g., any identification data including name, or the like) corresponding to the vehicle occupant. The identifying information of the vehicle occupant may be received in the same or a similar manner as the interest information. The identifying information of the vehicle occupant may be received with the interest information such that the interest information may be stored on the memory 204 with association to the vehicle occupant based on the received identifying information. The identifying information of the vehicle occupant may also be received to identify the vehicle occupant such that the processor 202 may identify the interest information associated with the vehicle occupant after the interest information associated with the vehicle occupant has been stored on the memory 204.

The processor 202 may identify one or more keywords (including, e.g., listening or watching preference data) from the data stored on the memory 204 based on the received identifying information. In that regard, the processor 202 may generate a data structure corresponding to, e.g., a user profile that includes the identifying information of the vehicle occupant and the associated interest information. In some embodiments, the apparatus 200 (i.e., the processor 202) may receive the interest information without any user identifying information to allow a vehicle occupant who may not have a predetermined user profile stored on the memory 204 to input data regarding the subject matter(s) of interest, and the apparatus 200 may monitor digital multimedia content from a variety of content sources based on the received interest information without looking up the interest information based on any user identifying information or user profile. In some embodiments, the interest information may also be received via an IVI system on a vehicle. In some embodiments, the interest information may also be received via a user device (e.g., a mobile device) connected to the apparatus 200 (e.g., utilizing a software application program installed on the user device and configured to, e.g., receive user input from a user to relay to the apparatus 200).

The apparatus 200 may receive streaming data from one or more digital multimedia content provider servers. The apparatus 200 may receive the streaming data from the one or more digital multimedia content provider servers simultaneously. The apparatus 200 may receive the streaming data from all available digital multimedia content provider servers or, in some embodiments, only some of the digital multimedia content provider servers based on a predetermined selection of the digital multimedia content provider server(s) to stream from (i.e., based on a default selection of particular one(s) of the digital multimedia content provider server(s) generally considered by the vehicle occupant to provide relevant content—e.g., based on the identifying information of the vehicle occupant received by the apparatus 200 to identify the keywords and/or listening/watching preferences to look for). In that regard, the apparatus 200 may establish one or more connections with, respectively, one or more digital multimedia content provider servers to start streaming content from the one or more digital multimedia content provider servers. In some embodiments, the apparatus 200 may continuously stream the content from all available digital multimedia content provider servers.

Then, the processor 202 may store a predetermined amount of the received streaming data on the memory 204. For example, the processor 202 may store the received streaming data as a plurality of digital content data 206 corresponding to the sets of streaming data received from, respectively, the various ones of the digital multimedia content provider servers. The processor 202 may store the predetermined amount of the received streaming data on the memory 204 while continuously replacing the stored data with newly received data in, e.g., a FIFO (first in, first out) manner such that the stored data is not too extensive in file size (i.e., within the physical limitation(s) based on the available space on the memory 204 for this purpose) while being sufficient to compare the stored data against the identified keywords and/or listening/watching preferences. For example, the predetermined amount of streaming data being stored on the memory 204 may be based on a predetermined amount of file size, duration of the audio or image/video stream, number of words in a text data, or the like. In this regard, the memory 204 may include or couple to a cache memory 208 where the plurality of digital content data 206 are stored before the received/stored streaming data is compared against the keywords and/or listening/watching preferences. In some embodiments, the predetermined amount of streaming data stored on, e.g., the cache memory 208 may be provided to the vehicle corresponding to the vehicle occupant such that the stored (i.e., recorded) streaming data (i.e., corresponding to the portion of the digital multimedia content streamed or provided before the IVI system on the vehicle tunes into the digital multimedia content provider based on user input) can be replayed (in part or in whole) to the vehicle occupant.

The processor 202 may compare the predetermined amount of the received streaming data against the identified one or more keywords to detect a match between at least a portion of the predetermined amount of the received streaming data and at least a portion of the one or more keywords based on the comparison. For example, the processor 202 may determine that there is a match when a major portion of the keywords is matched (e.g., a single word, phrase, a prescribed percentage, etc.). That is, the stored keywords may include a major portion and a minor portion (i.e., various portions of varying priorities). In some embodiments, the processor 202 may determine that there is a match when a major portion of the keywords is matched with a portion of the received streaming data. In some embodiments, the processor 202 may determine that there is a match when all of the portions (including various portions of varying priorities) of the keywords are matched with a portion of the received streaming data.

The processor 202 may then identify at least one digital multimedia content provider server of the one or more digital multimedia content provider servers based on the detected match, and transmit (e.g., via the network access device 212) data related to the identified digital multimedia content provider server to the vehicle. For example, the processor 202 may transmit information including the identity or location (i.e., IP (Internet Protocol) address) of the digital multimedia content provider server as well as an associated platform (e.g., a software application program by which the vehicle may connect to the identified digital multimedia content provider server). If more than one match is found at the same time, the processor 202 may transmit the relevant information for all of the matched content sources, or alternatively, send only information regarding one of the matched content sources based on, e.g., a predetermined priority (i.e., user preference information or schedule stored as priority data 210 on the memory 204) of the content source and/or the match of, e.g., minor portions of the keywords and/or listening/watching preferences.

In some embodiments, the keyword data stored on the memory 204 may be grouped or categorized based on vehicle occupant or user identifying information.

In some embodiments, the keyword data stored on the memory 204 may be grouped or categorized based on interest grouping information or interest category information such that the keyword data being used to compare the received streaming data against may be based on a selection amongst a plurality of predetermined options which may correspond to the interest grouping or category information.

In some embodiments, the digital multimedia content provider servers may each provide more than a single channel or type of content to be streamed. In that regard, the data related to the identified digital multimedia content provider server(s) may include an identification of a digital multimedia content channel or source accessible via (i.e., provided by) the identified digital multimedia content provider server(s).

In some embodiments, the processor 202 may receive status data of the vehicle connected to the apparatus 200. For example, the apparatus 200 may receive information regarding, e.g., the vehicle occupant(s) (including, e.g., identifying information such as a name as well as the status of the vehicle occupant(s) such as whether they are asleep, etc.), the status of the vehicle (e.g., state-of-charge (SOC) or remaining fuel information, the type or brand/model of the vehicle, etc.), the surrounding environment of the vehicle (e.g., a current location, a current speed, etc.), etc. which may be detected by one or more sensors such as image, location, or speed sensors and utilized (e.g., as part of an artificial intelligence (AI) algorithm configured to detect a pattern corresponding to one or more keywords or to identify the one or more keywords based on the status data of the vehicle) as interest information to identify relevant digital multimedia content and the corresponding digital multimedia content provider server(s). For example, when any vehicle occupant is sleeping, the processor 202 may look for content that may be suitable for the status of the vehicle occupant (e.g., corresponding to a predetermined type of music, etc.). Moreover, as another example, when the vehicle is low (e.g., below a predetermined threshold level) on the SOC or the remaining fuel, the processor 202 may look for content related to nearby charging stations or fueling stations.

In some embodiments, the condition such as the speed of the vehicle may correspond to a predetermined type of content to look for (e.g., a first speed—a relatively low speed—corresponding to a first type of content such as, e.g., a first type of music suitable for the relative low speed of the vehicle and a second speed—a relatively high speed—corresponding to a second type of content such as, e.g., a second type of music suitable for the relatively high speed of the vehicle). That is, a particular type of digital content (e.g., music) may be stored on the memory 204 as being associated with a particular condition (e.g., speed) of the vehicle, and such information may be used as one or more keywords or listening/watching preferences for identifying the type of digital content to stream. Furthermore, as yet another example, when the vehicle is, e.g., passing a particular location (e.g., a particular point of interest), the vehicle occupant may be interested in streaming content related to the particular location or the particular point of interest.

In some embodiments, the processor 202 may receive and monitor the streaming data only when the vehicle is in use.

In various embodiments, the received streaming data from the digital multimedia content provider servers may be or include audio data and/or image data. In order to monitor the received streaming data and compare the received streaming data against one or more keywords, the processor 202 may transcribe the received audio data and/or image data into corresponding text data and store the transcribed text data on the memory 204. The received audio data and/or image data may be transcribed into the corresponding text data in real time. In some embodiments, the image data may be converted to one or more keywords based on one or more image detection methods to identify one or more objects included in the image data to be used as basis for the keyword(s).

Figure 3:
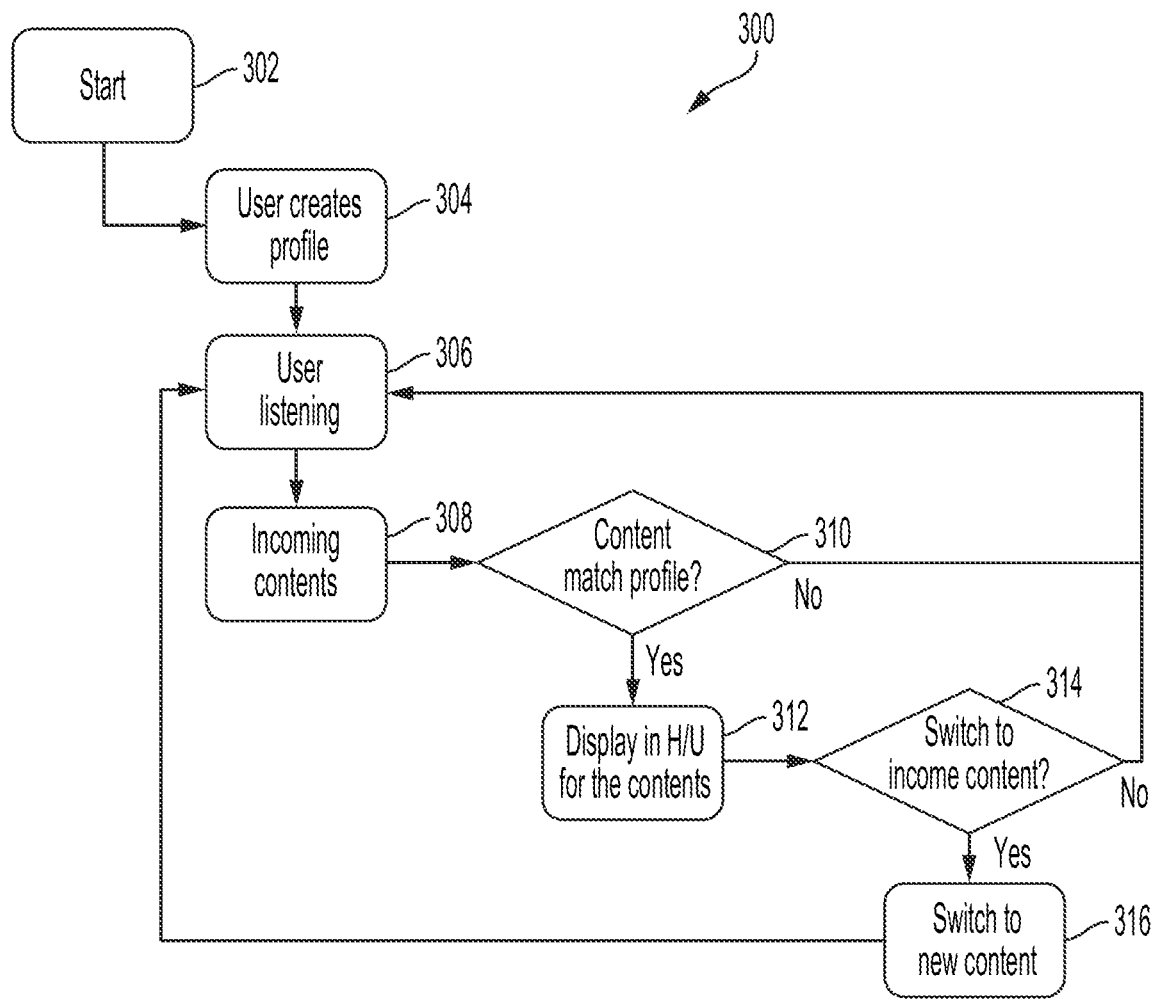
FIG. 3 is a flowchart of a method for automatically switching to a digital multimedia content provider on an IVI system according to an embodiment of the present invention.

Referring now to FIG. 3, FIG. 3 is a flowchart of a method 300 for automatically switching to a digital multimedia content provider on an IVI system. The method 300 may start with a remote server (e.g., a cloud server) receiving identifying information of a vehicle occupant and interest information of the vehicle occupant to create a user profile corresponding to the vehicle occupant and including the corresponding interest information (steps 302 and 304). Then, the vehicle occupant may stream multimedia content from a particular content source via the IVI system on or within a vehicle (step 306). In some embodiments, the vehicle occupant may not be streaming any data to start. The remote server may receive and monitor streaming data from a variety of content sources (step 308). The remote server may compare the received and monitored streaming data against one or more keywords associated with the vehicle occupant's user profile (step 310). When a match is found between a portion of the received and monitored streaming data and a portion of the keywords, the IVI system may receive an indication from the remote server corresponding to the detected match and provide a notification related to the detected match via any output device such as, e.g., a Head Unit (HU) (step 312). When no match is found, the vehicle occupant may continue to stream the content that was already being streamed via the IVI system. The notification from step 312 may include or be followed by another notification prompting the vehicle occupant whether to tune into a new content source based on the detected match (step 314). If the vehicle occupant chooses not to switch to the new content course, the IVI system may continue as-is (i.e., continue providing the content that was already being streamed, or at least do not start streaming from the new content source). If the vehicle occupant chooses to switch to the new content source, the vehicle occupant may provide a corresponding user input on the IVI system or the HU, and the IVI system may switch to (or the vehicle may initiate the IVI system to tune into) the new content source which the vehicle occupant can now start consuming (step 316).

Figure 4:
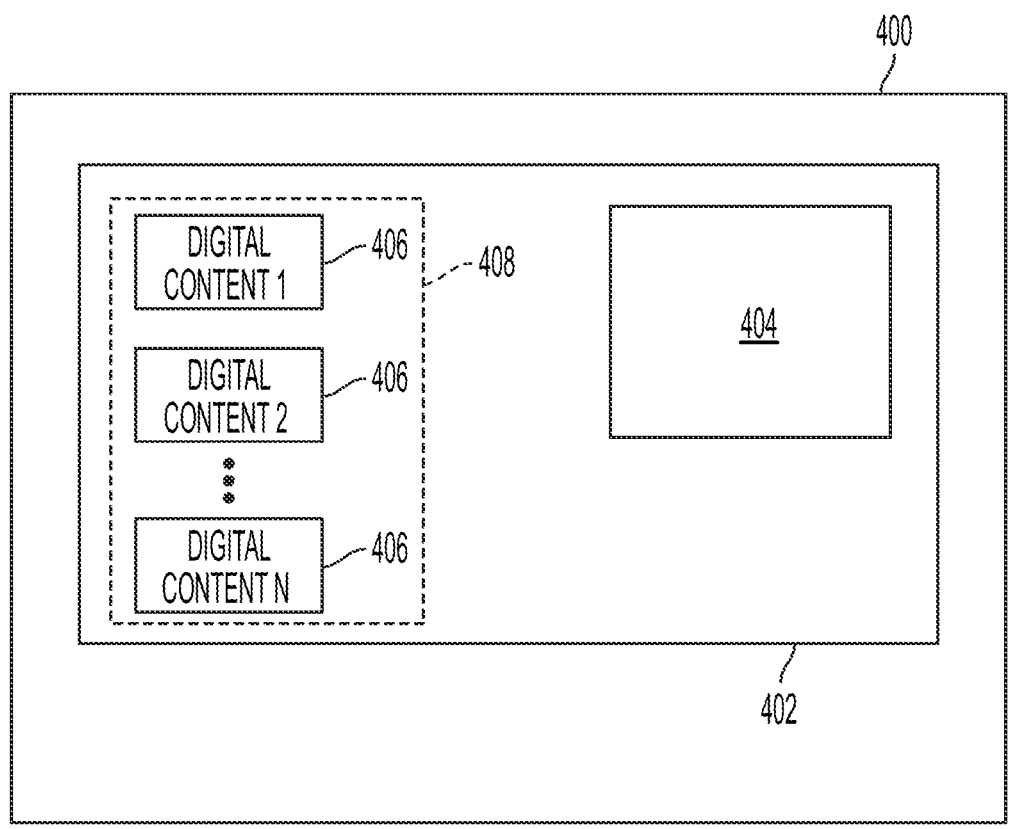
FIG. 4 is a block diagram illustrating an apparatus or a system for automatically switching to a digital multimedia content provider on an IVI system according to an embodiment of the present invention.

Turning now to FIG. 4, an apparatus (or a system) of a user interface 400 for automatically switching to a digital multimedia content provider on an IVI system is shown. Specifically, such apparatus or system may be or include the user interface 400. As described herein, the user interface 400 (e.g., on the IVI system on a vehicle as described herein) may be used to provide a notification 402 when a match is detected between the streaming data monitored by a remote server and one or more keywords (e.g., associated with a vehicle occupant). In some embodiments, the corresponding information of the notification 402 may be provided to the vehicle occupant as, e.g., a voice prompt only or in combination with the notification 402 provided (i.e., displayed) via the user interface 400. The notification 402 may include a first area 404 which may include a prompt to the vehicle occupant regarding whether to tune into a new content source or not as described herein. In some embodiments, the notification 402 may also provide (i.e., display) information regarding one or more content sources 406 in a second area 408. In some embodiments, the first area 404 (as well as the second area 408, in some examples) may provide an interactive user interface (e.g., a touch pad) which allows the vehicle occupant to interact directly with the notification 402 to provide the user input regarding whether to tune into the new content source. In some embodiments, the user input may be provided by other methods including, e.g., voice input (e.g., to be detected by an input device such as, e.g., a microphone connected to the IVI system) or input via other devices (such as, e.g., a user device such as mobile device) connected to the IVI system.

The received/selected streaming data may be provided to the vehicle occupant via an output device on or within the vehicle configured to output the received streaming data such as, e.g., a display, a speaker, or the like.

If there was any streaming data that was already being provided to the vehicle occupant when a match is detected between the content from the new content source and the keywords (and the vehicle occupant provides an indication to switch to the new content source based on the detected match), the IVI system may receive an instruction to automatically stop a first streaming module in data communication with the IVI apparatus on or within the vehicle and initiate a second streaming module in data communication with the IVI apparatus on or within the vehicle that is configured to receive the streaming data from the identified digital multimedia content provider server (i.e., the new content source) and to provide the received streaming data to an output device on or within the vehicle to output the received streaming data. In some embodiments, the notification 402 may include an instruction for the vehicle occupant to manipulate a connected user device equipped with an appropriate software module to connect to the new content source. Accordingly, the apparatuses, systems, and methods described herein may minimize the amount of distraction to tune into the new content source (e.g., by eliminating or minimizing the need for the vehicle occupant to continuously and manually flip through various content sources to look for the content they are interested in). In some embodiments, the user interface 400 may be or include or be a part of an enhance system including, e.g., a Head Unit (HU) and/or an augmented reality (AR) system. In some embodiments, the IVI system may automatically start streaming the content from the new content source (i.e., without requiring a user confirmation to switch to the new content source), e.g., based on a preset user setting.

Figure 5:
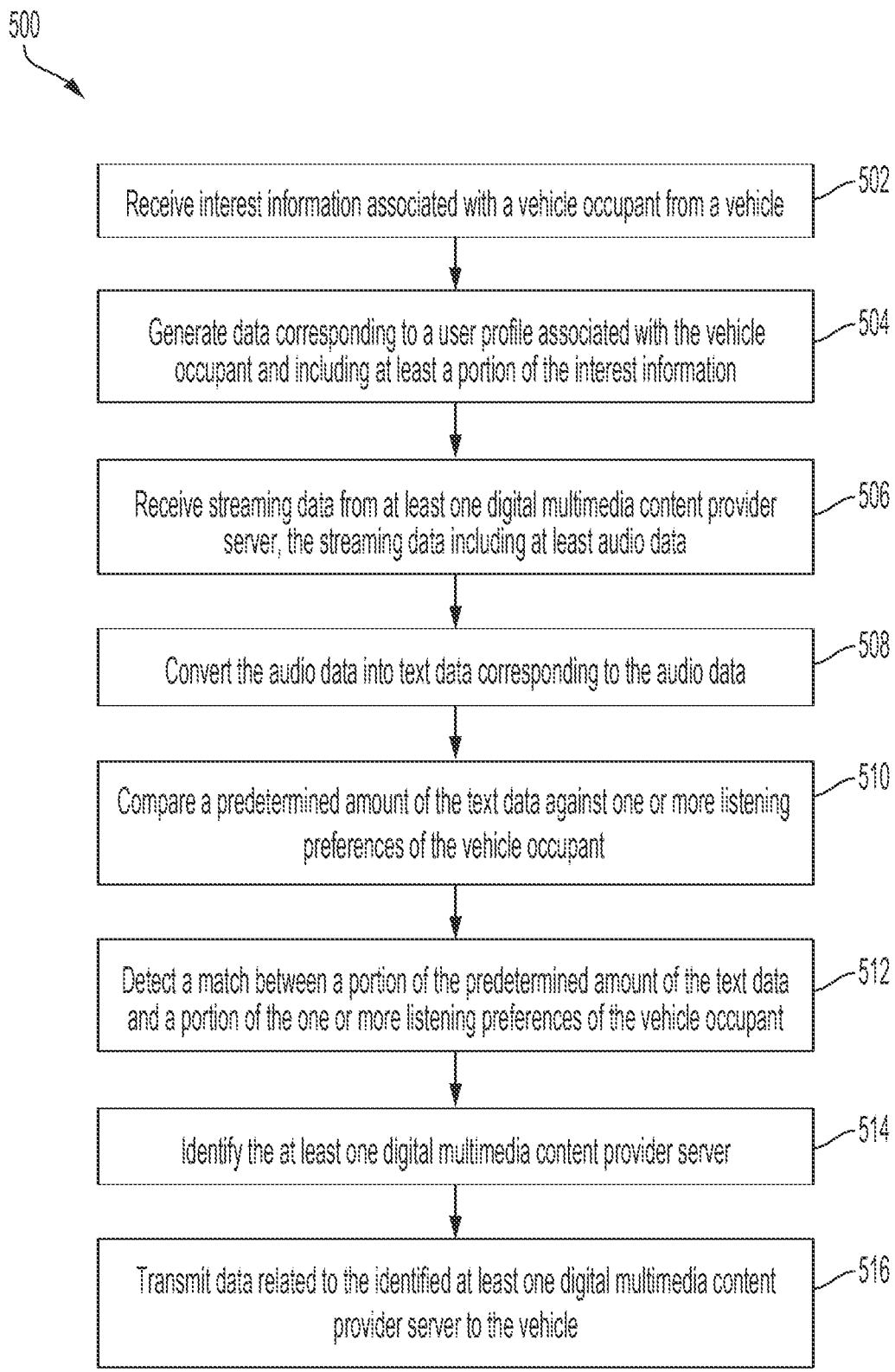
FIG. 5 is a flowchart of a method for automatically switching to a digital multimedia content provider on an IVI system according to an embodiment of the present invention.

FIG. 5 is a flowchart of a method 500 for automatically switching to a digital multimedia content provider, e.g., on an IVI system. The method 500, at least in part, may be implemented via a plurality of instructions (e.g., a software program) stored on a memory (similar to the memory 204 shown in and described herein with respect to FIG. 2) and accessed and processed by a processor (e.g., similar to the processor 202 shown in and described herein with respect to FIG. 2) to perform the various steps of the method 500.

The method 500 may include receiving, via a transceiver, interest information associated with a vehicle occupant from a vehicle (step 502). The interest information may include one or more listening (or watching) preferences of the vehicle occupant. Then, the method 500 may include generating, via a processor, data corresponding to a user profile associated with the vehicle occupant and including at least a portion of the interest information (step 504). In step 506, the method 500 may include receiving, via the transceiver, streaming data from at least one digital multimedia content provider server. The streaming data may include at least audio data. The streaming data may also include image or video data. The method 500 may then include converting, via the processor, the streaming data (e.g., the audio data) into text data corresponding to the streaming data (e.g., the audio data) (step 508). Moreover, the method 500 may include comparing, via the processor, a predetermined amount of the text data against the one or more listening (or watching) preferences of the vehicle occupant (step 510). In step 512, the method 500 may include detecting, via the processor, a match between a portion of the predetermined amount of the text data and a portion of the one or more listening (or watching) preferences of the vehicle occupant in response to the comparing. Then, the method 500 may include identifying, via the processor, the at least one digital multimedia content provider server in response to detecting the match between the portion of the predetermined amount of the text data and the portion of the one or more listening (or watching) preferences of the vehicle occupant (step 514).

Finally, the method 500 may include transmitting, via the transceiver, data related to the identified at least one digital multimedia content provider server to the vehicle (step 516).

The vehicle (e.g., one of the plurality of vehicles 104 shown in and described herein with respect to FIG. 1) receiving the data related to the identified digital multimedia content provider server may include an IVI system having a user interface (e.g., similar to the user interface 400 shown in and described herein with respect to FIG. 4) including an input module and an output module and a processor coupled to the user interface. The processor may receive first user input including one or more listening (or watching) preferences of a vehicle occupant via the input module, transmit data including at least a portion of the received user input to a remote server (e.g., similar to the server 102 or the apparatus 200 shown in and described herein with respect to, respectively, FIG. 1 or FIG. 2) via a network access device such as a transceiver connected to the processor, receive data including information related to a digital multimedia content provider associated with the one or more listening (or watching) preferences of the vehicle occupant from the remote server via the transceiver, display a notification (e.g., similar to the notification 402 shown in and described herein with respect to FIG. 4) including the information related to the digital multimedia content provider associated with the one or more listening (or watching) preferences of the vehicle occupant via the output module, receive second user input indicative of a confirmation of switching to the digital multimedia content provider on the IVI system, and start receiving streaming data (e.g., including at least one of audio data or image data) from the digital multimedia content provider via the transceiver and outputting the received streaming data via the output module.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. A system for automatically switching to a digital multimedia content provider, the system comprising:
   a memory configured to store user preference data; and
   a processor connected to the memory and configured to:
   receive user preference data associated with a vehicle occupant from the vehicle, the user preference data corresponding to one or more subject matters of interest and one or more listening/watching preferences of the vehicle occupant related to digital media content,
   receive first streaming data from a first channel of one or more digital multimedia content providers, the one or more digital multimedia content providers comprising one or more of a satellite radio service, an online radio service, a multimedia streaming service, or a podcast service, and the first streaming data including first content,
   transmit the first streaming data to the vehicle to play on an in-vehicle infotainment (IVI) system of the vehicle,
   receive second streaming data from a second channel of the one or more digital multimedia content providers, the second streaming data including second content,
   compare a predetermined amount of the second streaming data against the user preference data,
   detect a match between at least a portion of the predetermined amount of the received second streaming data and at least a portion of the user preference data based on the comparison,
   determine that the second streaming data is more desirable for consumption for the vehicle occupant than the first streaming data based on the user preference data, and
   automatically transmit the second streaming data to the vehicle to play on the IVI system of the vehicle in place of the first streaming data when the second streaming data is more desirable than the first streaming data.

2. The system of claim 1, wherein the user preference data stored on the memory is grouped or categorized based on user identifying information.

3. The system of claim 1, wherein the user preference data stored on the memory is grouped or categorized based on interest grouping information or interest category information.

4. The system of claim 1, wherein the portion of the user preference data includes a predetermined percentage of the user preference data.

5. The system of claim 1, wherein the portion of the user preference data includes an entirety of the user preference data.

6. The system of claim 1, further comprising transmitting data related to the second channel associated with the second streaming data, wherein the data includes an identification of a software application program installed on the vehicle corresponding to the second channel associated with the second streaming data.

7. The system of claim 6, wherein the data related to the second channel associated with the second streaming data includes an identification of a digital multimedia content channel or source provided by the digital multimedia content provider associated with the second channel associated with the second streaming data.

8. The system of claim 1, wherein the processor is further configured to receive status data of the vehicle.

9. The system of claim 8, wherein the status data of the vehicle includes an indication of whether the vehicle is in use, wherein the receipt of the first streaming data includes receipt of the first streaming data from the one or more digital multimedia content providers only when the vehicle is in use.

10. The system of claim 8, wherein the status data of the vehicle includes at least one of a current speed of the vehicle, a current location of the vehicle, or a current status of the vehicle occupant, wherein the processor is further configured to identify the user preference data based on the status data of the vehicle.

11. The system of claim 1, wherein the receipt of the first streaming data from the one or more digital multimedia content providers includes receipt of first streaming data from two or more of the one or more digital multimedia content providers.

12. The system of claim 1, wherein the processor is configured to:
   identify data corresponding to a user profile associated with the vehicle occupant stored on the memory, and identify the user preference data based on the user profile.

13. The system of claim 1, wherein to receive the first streaming data from the first channel of the one or more digital multimedia content providers the processor is configured to:
   receive audio data of the first streaming data,
   transcribe the received audio data into corresponding text data, and
   store the transcribed text data on the memory.

14. The system of claim 13, wherein the transcription of the received audio data into the corresponding text data includes transcription of the received audio data into the corresponding text data in real time.

15. The system of claim 1, further comprising transmitting information to the vehicle to be displayed as part of a menu provided on the IVI system on or within the vehicle to enable the IVI system on or within the vehicle to automatically start receiving the first streaming data.

16. The system of claim 15, wherein the transmission of the information to be displayed as part of the menu provided on the IVI system on or within the vehicle includes transmission of an instruction to automatically initiate a streaming module in data communication with the IVI system on or within the vehicle that is configured to receive the first streaming data from the first channel of the one or more digital multimedia content providers and to provide the received first streaming data to an output device on or within the vehicle to output the received first streaming data.

17. The system of claim 15, wherein the transmission of the information to be displayed as part of the menu provided on the IVI system on or within the vehicle includes transmission of an instruction to automatically stop a first streaming module in data communication with the IVI system on or within the vehicle and initiate a second streaming module in data communication with the IVI system on or within the vehicle that is configured to receive the second streaming data and to provide the received second streaming data to an output device on or within the vehicle to output the received second streaming data.

18. The system of claim 1, wherein the processor is configured to:
   prior to transmitting the second streaming data, display a notification for the vehicle occupant comprising a prompt to select or decline to play the second streaming data on the IVI system and information related to the digital multimedia content provider associated with the second streaming data, and
   receive a user input to select to play the second streaming data on the IVI system.

\* \* \* \* \*